United States Patent
Merino-Lopez et al.

(10) Patent No.: US 8,151,845 B2
(45) Date of Patent: Apr. 10, 2012

(54) TIRE WITH REDUCED ROLLING NOISE

(75) Inventors: Jose Merino-Lopez, Riom (FR); Luc Bestgen, Chatel-Guyon (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 925 days.

(21) Appl. No.: 12/108,138

(22) Filed: Apr. 23, 2008

(65) Prior Publication Data

US 2008/0264539 A1    Oct. 30, 2008

(30) Foreign Application Priority Data

Apr. 26, 2007  (FR) ...................................... 07 03118

(51) Int. Cl.
- B60C 5/00 (2006.01)
- B60C 5/20 (2006.01)
- B60C 19/00 (2006.01)

(52) U.S. Cl. .................. 152/331.1; 152/339.1; 152/450; 152/510

(58) Field of Classification Search ............... 152/331.1, 152/332.1, 334.1, 335.1, 336.1, 337.1, 338.1, 152/339.1, 340.1, 341.1, 342.1, 450, 510, 152/511, 512, 513, 514, 515, 516, 517, 518, 152/519, 520

See application file for complete search history.

(56) References Cited

U.S. PATENT DOCUMENTS

| | | | | |
|---|---|---|---|---|
| 2,713,372 A | * | 7/1955 | Darrow | 152/342.1 |
| 2,900,005 A | * | 8/1959 | Riggs | 152/341.1 |
| 3,607,601 A | * | 9/1971 | Milam et al. | 428/316.6 |
| 4,252,378 A | | 2/1981 | DeBolt et al. | 301/63 |
| 4,392,522 A | | 7/1983 | Bschorr | 152/341 |
| 4,399,851 A | | 8/1983 | Bschorr | 152/156 |
| 5,538,061 A | * | 7/1996 | Blair | 152/342.1 |
| 6,343,843 B1 | | 2/2002 | Nishikawa | 301/6.91 |
| 6,716,380 B2 | | 4/2004 | Durif et al. | 264/51 |
| 2001/0004924 A1 | | 6/2001 | Aoki et al. | 156/394.1 |
| 2002/0144760 A1 | | 10/2002 | Devizzi et al. | 152/209.2 |
| 2006/0209626 A1 | * | 9/2006 | Kojima et al. | 366/173.2 |

FOREIGN PATENT DOCUMENTS

| | | | |
|---|---|---|---|
| DE | 3112082 | * | 1/1983 |
| DE | 40 01 753 A1 | | 7/1991 |
| DE | 102 20 193 A1 | | 11/2003 |
| DE | 10255167 | * | 1/2004 |
| EP | 1 155 801 A1 | | 11/2001 |
| EP | 0 912 354 B1 | | 12/2001 |
| EP | 1 214 205 B1 | | 3/2004 |
| EP | 1 510 366 A1 | | 3/2005 |
| GB | 23231886 | * | 8/1998 |
| JP | 09011705 | * | 1/1997 |
| WO | WO 97/49566 | * | 12/1997 |
| WO | WO 9821056 | * | 5/1998 |

* cited by examiner

*Primary Examiner* — Justin Fischer
(74) *Attorney, Agent, or Firm* — Fitzpatrick, Cella, Harper & Scinto

(57) ABSTRACT

A tire with reduced rolling noise includes a tire structure formed of at least one crown extended by two sidewalls and two beads. A base of each of the two beads is configured to be mounted onto a rim seat. The tire also includes a carcass-type reinforcing structure anchored into the two beads and an additional layer bonded to an inner wall of the tire structure. The additional layer is bonded to the tire structure at its edges and the rest of the additional layer is not bonded. The additional layer includes an inflation valve.

23 Claims, 4 Drawing Sheets

Fig. 5
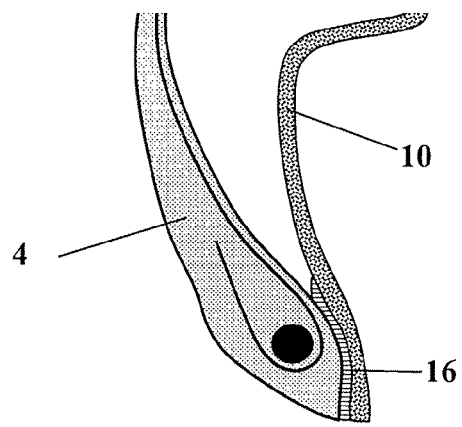
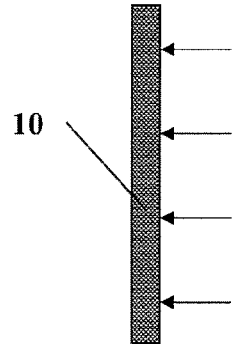
Fig. 6
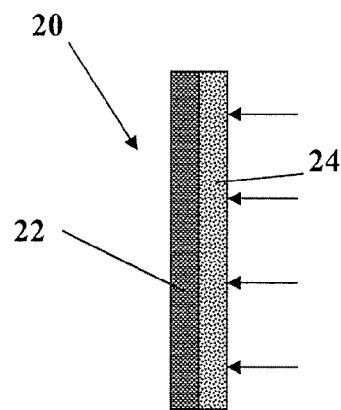
Fig. 7
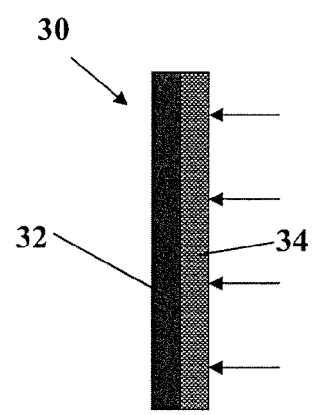
Fig. 8

TIRE WITH REDUCED ROLLING NOISE

FIELD OF THE INVENTION

The invention relates to a tire whose rolling noise within a vehicle is reduced so as to give improved comfort.

BACKGROUND

Many different noises pollute the environment of a vehicle. Some are due to the tires. In this type of noise, one part of the noise spectrum that is of particular nuisance is the cavity mode. The cavity mode is the resonance of the column of air inside the tire.

The frequency range of the interior noise in a vehicle, which results from a tire when traveling, typically is 80 to 500 Hz. The frequency of the cavity mode is a function of the size of the tire. At very low speed, a peak in the first cavity mode (FCM) is around 230 Hz.

When traveling, two peaks appear. At 80 km/h, the frequencies of these peaks are approximately 210 and 250 Hz. FIG. 1 clearly shows these frequencies (arrow A). From a subjective point of view of comfort, the peaks in the FCM are a nuisance as they are very audible.

It is known that placing mobile components inside a tire may have a positive effect on reducing the interior noise, in particular a damping of the first cavity mode. European patent document EP 1 214 205 B1 clearly illustrates this principle. For example, particles of open-cell materials may be placed in the tire cavity.

U.S. Pat. No. 6,343,843 discloses a pneumatic tire, which is provided with lawn-like materials for damping air resonance of the tire cavity.

Alternatively, filling the cavity with foam or another material, such as sand, is presented in US Patent Application Publication No. 2001/0004924.

U.S. Pat. No. 4,252,378 describes an arrangement in which the rim of a tire is filled with a foam.

European patent document EP 1 510 366 A1 describes an arrangement in which a noise-damping body is placed under a crown zone of a tire.

German patent document DE 102 20 194 describes a tire that includes an absorbent wall placed in an inner cavity of the tire, bonded to two beads of the tire but not bonded elsewhere to an inner wall of the tire. This absorbent wall includes microperforations for damping an air resonance of the tire cavity and a valve to allow inflation and deflation of the tire.

The preceding systems are complex and expensive.

SUMMARY OF THE INVENTION

To overcome these drawbacks, an aspect of the invention provides a tire that includes a tire structure formed of at least one crown extended by two sidewalls and two beads. A base of each of the two beads is adapted for mounting onto a rim seat. The tire also includes a carcass-type reinforcing structure anchored into the two beads and an additional layer bonded to an inner wall of the tire structure. The additional layer is bonded to the tire structure at its edges and the rest of the additional layer is not bonded, such that the additional layer cooperates with the inner wall of the tire to form an airtight cavity. The additional layer includes an inflation valve.

In an embodiment, the edges of the additional layer are bonded to the inner wall of the tire structure between the equator and the beads of the tire structure.

Advantageously, the edges of the additional layer are positioned at the beads.

The fact that the additional layer includes an inflation valve and is bonded to the tire structure at its edges enables the additional layer to be flattened against the rim after the tire is mounted and inflated. The additional layer may thus have a positive effect on damping the rolling noise when the tire is traveling.

The tire, according to this embodiment of the invention, has the advantage of being able to be mounted onto a non-airtight rim and gives the tire/rim assembly thus formed a behavior very close to that of a conventional tubeless assembly in terms of rolling resistance and puncture resistance.

Advantageously, a curved length of the additional layer in any axial cross section ($L_{ca}$) is greater than a curved length of the inner wall of the tire structure, from one equator of the tire structure to the other, in the same axial cross section ($L_{pe}$).

This guarantees, especially when the additional layer is attached to the inner wall of the tire structure at the beads, that after the tire is on a rim and inflated, the additional layer has an overlength relative to a cross section of the rim and fits against the wall of the rim by forming folds. These folds give an uneven surface that functions to improve the noise absorption capacity when traveling and especially to improve the noise absorption capacity of the first cavity mode.

According to one advantageous feature:

$$\frac{L_{ca}}{L_{pe}} > 1.2 \text{ or } 1 < L_{ca}/L_{pe} < 4.$$

According to a preferred embodiment, the additional layer is a cellular layer.

The noise improvement (i.e., reduction) linked to this preferred embodiment is very significant. The impact is greater than 4 dBA in the zones of the noise spectrum corresponding to the peaks in the first cavity mode (FCM) and of the order of 3 dBA overall in the frequencies between 180 and 350 Hz, relative to a tire without a cellular layer applied against the rim.

The effect on reducing the noise is even more positive when the cellular layer is large compared to the tire, which means that, even after the tire is inflated, the surface of the cellular layer is not taut but is folded. The presence of these folds means that the geometry of the cavity is less "even" and thus the folds are positive factors in noise absorption.

According to another embodiment, the additional layer includes a first layer made of a cellular material and a second layer made of a non-cellular material. Preferably, the cellular material layer is positioned between the non-cellular material layer and the tire structure.

Advantageously, the cellular layer is predominantly a closed-cell cellular layer.

The thickness of the additional layer may be between 0.5 and 10 mm and preferably between 1 and 4 mm.

The density of the cellular layer may be between 0.04 and 0.8 g/cm$^3$ and preferably between 0.06 and 0.3 g/cm$^3$.

Another aspect of the invention is a tire, such as that described previously, which includes, in addition, a self-sealing material positioned between the tire structure and the additional layer.

Preferably, the self-sealing material is a viscous liquid.

Advantageously, according to an embodiment, the self-sealing material contains at least one of the constituents chosen from a group that includes glycol, fibers, vulcanized rubber particles, cellular material particles, and mixtures thereof. The self-sealing material also preferably has a non-aqueous fluid matrix, which makes it possible to limit the possible problems associated with corrosion.

The self-sealing material may preferably have a viscosity of less than 60 centipoise at 20° C.

The tire of this embodiment, with an integrated inner tube, has the advantage of possessing good self-sealing properties in case of a puncture without posing manufacturing problems or problems associated with introducing self-sealing products at the time of the punctures.

Another aspect of the invention is a mounted assembly that includes a tire, such as one of the tires described previously, and a rim. A tire valve is positioned in a valve hole of the rim. The rim may advantageously be a rim for a tire/inner tube assembly.

Another aspect of the invention is a process for manufacturing a tire. The process includes:
placing on a manufacturing drum a layer of material referred to as an additional layer;
applying an anti-tack agent at zones of the additional layer that are intended not to be bonded to a tire structure;
applying an airtight material layer;
completing preparation of the tire structure;
vulcanizing the tire structure; and
attaching an inflation valve to the additional layer.

The anti-tack agent may be talc or chalk.

Advantageously, when the additional layer is formed of a cellular material that includes a foaming agent, after the tire structure is vulcanized, the cellular material of the additional layer undergoes an expansion, which takes place at ambient pressure.

After having completed the manufacture of the tire, it is possible to introduce a self-sealing material between the additional layer and an inner wall of the tire structure. This introduction may be carried out before or after the attachment of the inflation valve.

BRIEF DESCRIPTION OF THE DRAWINGS

Details of embodiments of the invention are given in the description which follows, supplemented by the appended drawings of FIGS. 1 to 8, in which:

FIG. 5 illustrates a process of bonding an additional layer to a bead; and

FIGS. 6, 7, and 8 give three examples of arrangements of an additional layer.

DETAILED DESCRIPTION OF EMBODIMENTS OF THE INVENTION

In what follows, the expression "axial cross section" of a tire is understood to mean any cross section that passes through the axis of rotation of the tire; and the expressions "transverse cross section" and "longitudinal cross section" are understood to mean any cross section perpendicular to the axis of rotation of the tire.

Figure 1:
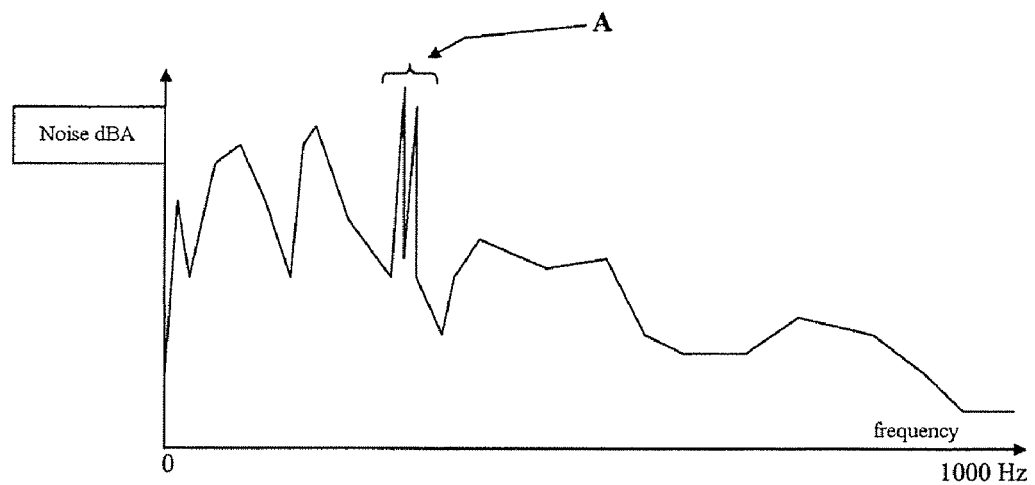
FIG. 1 illustrates a typical noise spectrum of a vehicle traveling at 80 km/h.

FIG. 1 presents a typical spectrum of noise amplitude as a function of frequency measured in a passenger vehicle traveling at 80 km/h. Two peaks, linked to a first cavity mode around 230 Hz (arrow A), are particularly noted. These two peaks are very audible and are a great nuisance from the point of view of comfort for the driver or a passenger of the vehicle.

Figure 2:
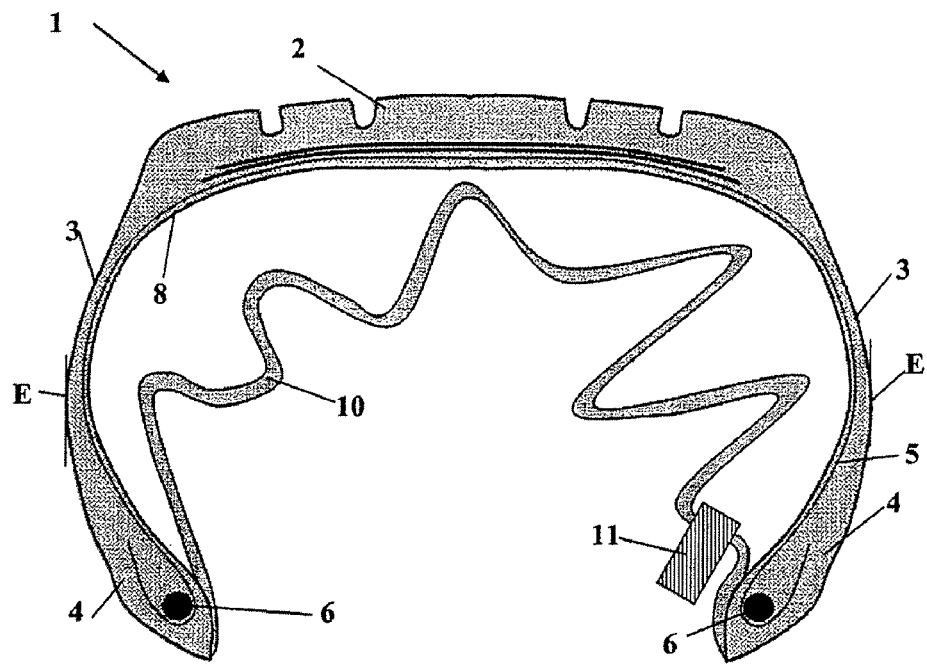
FIG. 2 illustrates an example of a tire that includes an additional layer, according to an embodiment of the invention.

FIG. 2 presents a tire 1 according to an embodiment of the invention seen in a partial axial cross section. The tire includes a tire structure formed of at least a crown 2 and two sidewalls 3 extended by two beads 4. A carcass-type reinforcing structure 5 is anchored into the two beads 4 around bead wires 6. The tire also includes an additional layer 10 bonded to an inner wall 8 of the tire structure at the two beads 4 but not bonded elsewhere, that is, the additional layer 10 preferably is not bonded at the sidewalls 3 or the crown 2. The sites for bonding of the additional layer may be positioned on the inner wall 8 of the tire structure at any zone of the beads 4 or of the sidewalls 3 up to an equator E of the tire 1. One preferred zone is at the beads 4 as illustrated in FIG. 2. The additional layer 10 is, in this example, a cellular layer. That is, the additional layer 10 is formed of a cellular material with internal cells that are predominantly closed and filled with a pressurized gas. Such cellular materials are well known to a person skilled in the art. The additional layer 10 need not be cellular; however, in this case the advantages in terms of rolling noise reduction are reduced. The additional layer 10 also includes a valve 11 intended to allow an inner cavity of the tire 1, defined by the inner wall 8 and the additional layer 10, to be inflated. It is this that enables the additional layer 10 to be flattened against a rim 7 after mounting on the rim 7 and inflating and thus to be effective against the rolling noise and especially to reduce the peaks in the first cavity mode.

Figure 3:
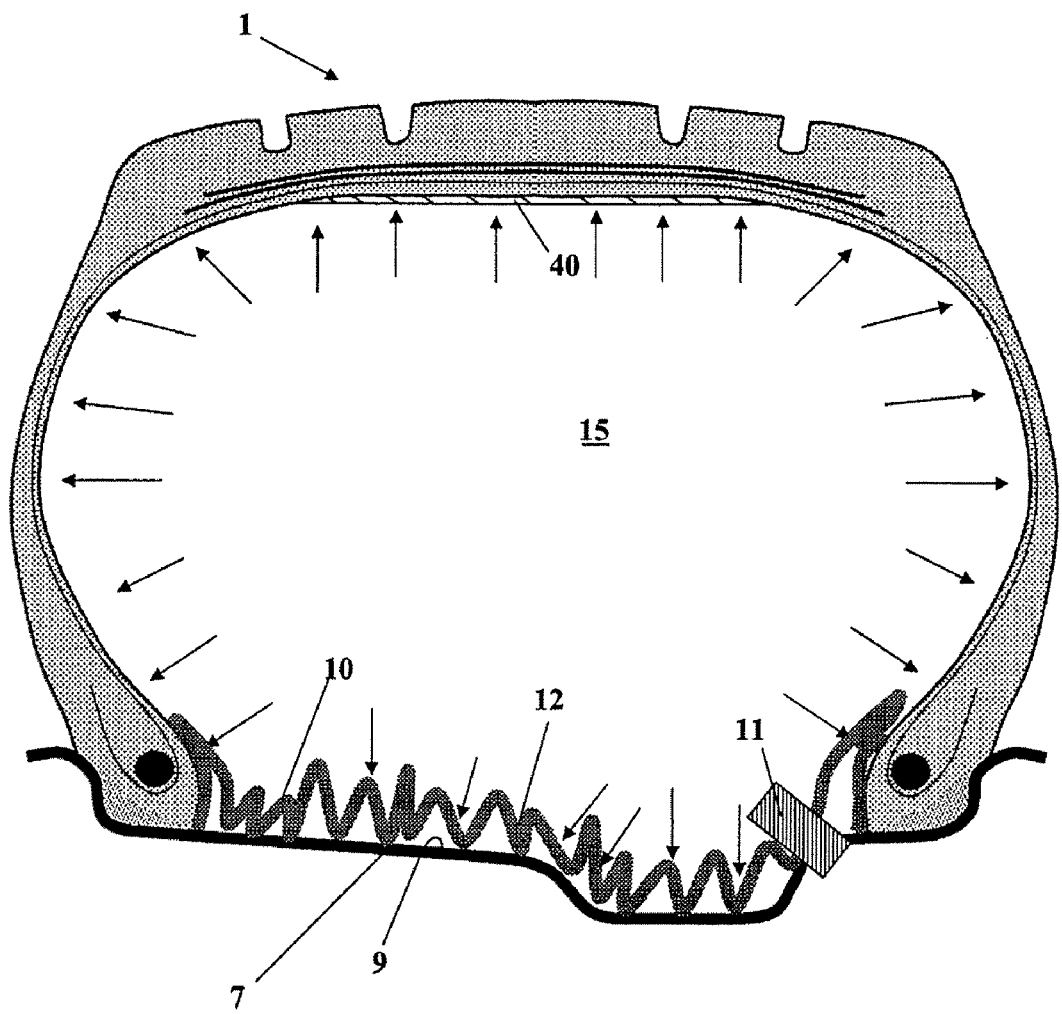
FIG. 3 illustrates the tire of FIG. 2 mounted on its service rim and inflated.

Another feature of the additional cellular layer 10 of the present embodiment is that it has a curved length in any axial and longitudinal cross section of the tire 1, and this curved length is advantageously greater than a curved length in the same axial or respectively longitudinal cross section of the inner wall 8 of the tire structure as measured from one equator E to the other while passing through the crown 2. The result of this is that when the tire 1 according to this embodiment of the invention is mounted on its service rim 7 and inflated to its operating pressure, the additional layer 10 is flattened against an outer wall 9 of the rim 7 by making folds 12, such as illustrated in FIG. 3. As a consequence of the presence of these folds 12, the wall of the pressurized tire cavity 15, at the rim 7, is an uneven surface, which promotes the damping of rolling noise. In FIG. 3, the arrows illustrate the action of the inflation pressure on the additional layer 10 and the wall of the tire 1. As shown in FIG. 3, the valve 11 of the additional layer 10 is engaged in a valve hole of the rim 7.

Figure 4:
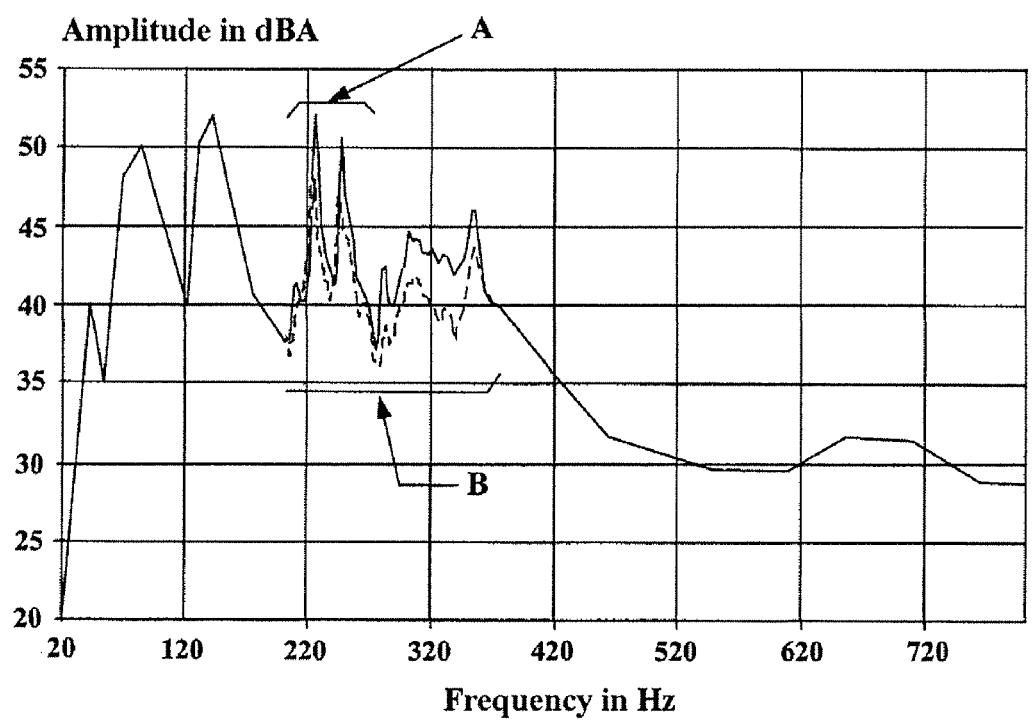
FIG. 4 schematically illustrates an improvement obtained with an additional cellular layer, according to an embodiment of the invention.

FIG. 4 presents noise measurement results taken in a vehicle traveling at 80 km/h over a macro-rough ground in two configurations:
solid line: the vehicle is equipped with standard tires inflated to 2.3 bar; and
dotted line: the same vehicle is equipped with tires according to an embodiment of the invention, each including an additional cellular layer 10 flattened against the wall of the rim 7.

In particular, an improvement of 4 to 6 dBA is noted for the two peaks in the first cavity mode (arrow A). More generally, an improvement of around 3 dBA is noted in the frequency range of 180-350 Hz, this frequency range being particularly sensitive for comfort (arrow B).

FIG. 5 illustrates the attachment of the additional layer 10 to the inner wall 8 of the bead 4. This attachment is provided by the presence of a layer 16 of bonding material.

In a preferred case where the additional layer 10 includes a rubber material compatible with an airtight rubber layer that constitutes the inner wall 8 of the tire structure, the layer 16 is not necessary because a chemical bond of sufficient quality is formed during vulcanization.

FIG. 6 presents one particularly simple embodiment of an additional cellular layer 10 (i.e., the additional layer 10 is a cellular layer). This cellular layer 10 is composed of a predominantly closed-cell cellular material. One example of such a material is based on butyl rubber and is described in European patent documents EP 0 912 354 B1 and EP 1 155 801 B1 by the present Applicants.

FIG. 7 presents an additional layer 20 according to another embodiment of the invention. This additional layer 20 is a cellular layer that is composed of a first predominantly closed-cell cellular layer 22, preferably produced with a butyl rubber that includes a foaming agent, and a second predominantly open-cell cellular layer 24. This second cellular layer 24 may be formed by modifying the amounts of foaming agent in a second layer of butyl material to give, after expansion, predominantly open cells. The second cellular layer 24, as indicated by the arrows, is positioned towards the inside of the pressurized tire cavity.

FIG. 8 presents an additional layer 30 according to yet another embodiment of the invention. This additional layer 30 includes a first layer of non-cellular airtight rubber 32 and a second layer of cellular rubber 34 in contact with the inflation air. Preferably, the two layers 32 and 34 are produced from a butyl rubber without a foaming agent for the first rubber layer 32 and with a foaming agent for the second rubber layer 34. An advantage of this approach is that it provides an excellent gas tightness (i.e., gas impermeability) for the additional layer 30.

The density of the foam may range from 0.04 g/cm³ to 0.8 g/cm³. To optimize the absorption quality and the mass of the mounted assembly, the density preferably is between 0.06 and 0.3 g/cm³.

The thicknesses of the additional layers presented in FIGS. 6, 7, and 8 may be between 0.5 and 10 mm, depending on the applications and on their structures. Of course, the thicknesses of cellular layers may be greater than those of layers that are not cellular.

The tire illustrated in FIGS. 2, 3, 5, and 6 includes an additional cellular layer made of butyl rubber and no airtight layer made of a compatible material continuously attached to the tire structure. This tire is easily produced by applying, to a standard manufacturing drum, a first layer of butyl rubber that includes a foaming agent; then applying two strips of butyl rubber without a foaming agent at edges of the first layer; applying, as is customary, all the other constituents of the tire; then vulcanizing the tire. After vulcanization, the gas particles released by the heat of the vulcanization process lead to an expansion of the additional cellular layer such that its axial and longitudinal dimensions correspond to that which is required in order to obtain a satisfactory absorption of the rolling noise. The additional cellular layer then has a thickness and a density that are suitable for ensuring a sufficient tightness with respect to gases.

When the tire includes an airtight layer that is compatible with the material of the additional cellular layer, for example when the two layers include butyl rubber, it is advisable to add an anti-tack agent in order to guarantee the effective debonding of the additional cellular layer from the opposite wall of the tire during the expansion phase of the additional cellular layer.

Also seen in FIG. 3, positioned at the crown 2 of the tire 1 against the inner wall 8, is a layer of self-sealing material 40 intended to promote the sealing of holes linked to a possible puncture. This self-sealing material 40 is preferably a viscous liquid. Preferably, the self-sealing material 40 is based on a non-aqueous liquid and includes at least one of the following components: glycol, fibers, particles of cured rubber, particles of a cellular material. Its viscosity is preferably less than 60 centipoise at 20° C. The self-sealing material 40 can be introduced into the cavity 15 formed by the inner wall of the tire and the additional layer 10 before or after having attached the inflation valve 11 to the additional layer.

The invention is not limited to the examples described and represented herein, and various modifications may be made thereto without departing from its scope as defined by the appended claims.

What is claimed is:

1. A tire comprising:
a tire structure formed of at least one crown extended by two sidewalls and two beads, wherein a base of each of the two beads is configured to be mounted onto a rim seat;
a carcass-type reinforcing structure anchored into the two beads; and
an additional layer bonded to an inner wall of the tire structure,
wherein the additional layer is bonded to the tire structure at edges of the additional layer and the additional layer is not bonded to the tire structure elsewhere,
wherein a length of the additional layer is greater than a length of an opening between the two beads,
wherein the additional layer in conjunction with the inner wall of the tire structure forms an airtight cavity,
wherein the additional layer includes an inflation valve,
wherein, when the airtight cavity is inflated for operation, via the inflation valve, the additional layer is pushed towards a rim wall at the opening between the two beads and away from the inner wall of the tire structure, and folds are formed in the additional layer, and
wherein the additional layer includes a first layer made of a cellular material and a second layer made of a non-cellular material.

2. A tire according to claim 1, wherein the edges of the additional layer are bonded to the inner wall of the tire structure between an equator and the beads of the tire structure.

3. A tire according to claim 2, wherein the edges of the additional layer are positioned at the beads.

4. A tire according to claim 1, wherein a curved length of the additional layer in any axial cross section ($L_{ca}$) is greater than a curved length of the inner wall of the tire structure from one equator of the tire to another in a same axial cross section ($L_{pe}$).

5. A tire according to claim 4, wherein:

$$\frac{L_{ca}}{L_{pe}} > 1.2.$$

6. A tire according to claim 4, wherein:

$$1 < L_{ca}/L_{pe} < 4.$$

7. A tire according to claim 1, wherein the cellular material of the first layer is positioned between the non-cellular material of the second layer and the tire structure.

8. A tire according to claim 1, wherein the cellular material is a predominantly closed-cell cellular material.

9. A tire according to claim 1, wherein a thickness of the additional layer is between 0.5 and 10 mm.

10. A tire according to claim 9, wherein the thickness of the additional layer is between 1 and 4 mm.

11. A tire according to claim 1, wherein a density of the cellular material of the additional layer is between 0.04 and 0.8 g/cm$^3$.

12. A tire according to claim 11, wherein the density of the cellular material of the additional layer is between 0.06 and 0.3 g/cm$^3$.

13. A tire according to claim 1, further comprising a self-sealing material positioned between the tire structure and the additional layer.

14. A tire according to claim 13, wherein the self-sealing material is a viscous liquid.

15. A tire according to claim 14, wherein the self-sealing material includes at least one constituent chosen from a group that includes: glycol, fibers, vulcanized rubber particles, cellular material particles, and mixtures thereof.

16. A tire according to claim 13, wherein the self-sealing material has a non-aqueous fluid matrix.

17. A tire according to claim 13, wherein the self-sealing material has a viscosity of less than 60 centipoise at 20° C.

18. A mounted assembly comprising:
a tire; and
a rim including a rim seat and a rim wall,
wherein the tire includes:
a tire structure formed of at least one crown extended by two sidewalls and two beads, wherein a base of each of the two beads is configured to be mounted onto the rim seat,
a carcass-type reinforcing structure anchored into the two beads, and
an additional layer bonded to an inner wall of the tire structure,
wherein the additional layer is bonded to the tire structure at edges of the additional layer and the additional layer is not bonded to the tire structure elsewhere,
wherein a length of the additional layer is greater than a length of an opening between the two beads,
wherein the additional layer in conjunction with the inner wall of the tire structure forms an airtight cavity,
wherein the additional layer includes an inflation valve, and
wherein, when the airtight cavity is inflated for operation, via the inflation valve, the additional layer is pushed towards the rim wall at the opening between the two beads and away from the inner wall of the tire structure, and folds are formed in the additional layer.

19. A mounted assembly according to claim 18, wherein the rim is for a tire and inner tube assembly.

20. A mounted assembly according to claim 18, wherein the additional layer includes a first layer made of a cellular material and a second layer made of a non-cellular material.

21. A mounted assembly according to claim 18, wherein the cellular material of the first layer is positioned between the non-cellular material of the second layer and the tire structure.

22. A mounted assembly according to claim 18, wherein a density of the cellular material of the additional layer is between 0.04 and 0.8 g/cm$^3$.

23. A mounted assembly according to claim 22, wherein the density of the cellular material of the additional layer is between 0.06 and 0.3 g/cm$^3$.

\* \* \* \* \*